US005717418A

United States Patent [19]

Shapiro et al.

[11] Patent Number: 5,717,418

[45] Date of Patent: Feb. 10, 1998

[54] FERROELECTRIC LIQUID CRYSTAL DISPLAY APPARATUS AND METHOD OF MAKING IT

[75] Inventors: Leonid Shapiro, Lakeside; Robert W. Shaw, Escondido, both of Calif.

[73] Assignee: Proxima Corporation, San Diego, Calif.

[21] Appl. No.: 298,414

[22] Filed: Aug. 30, 1994

[51] Int. Cl.[6] .......... G02F 1/133

[52] U.S. Cl. .......... 345/89; 345/90; 345/97

[58] Field of Search .......... 345/87, 89, 90, 345/92, 97; 359/56

[56] References Cited

U.S. PATENT DOCUMENTS

| | | | |
|---|---|---|---|
| 4,766,430 | 8/1988 | Gillette et al. | 345/89 |
| 5,091,722 | 2/1992 | Kitajima et al. | 345/89 |
| 5,250,937 | 10/1993 | Kikuo et al. | 345/89 |
| 5,323,172 | 6/1994 | Koden | 345/97 |
| 5,400,044 | 3/1995 | Thomas | 345/89 |

*Primary Examiner*—Richard Hjerpe
*Assistant Examiner*—M. Fatahiyar
*Attorney, Agent, or Firm*—Bernard L. Kleinke; Peter P. Scott

[57] ABSTRACT

A new and improved ferroelectric liquid crystal display system having a matrix structure of pixel elements each including a transistor active switching device and a ferroelectric cell. Each switching device is coupled to an individual storage capacitor which is charged during each row select time when the switching device is activated, and which is discharged during each frame time when the switching device is deactivated. A plurality of multi-level or analog column drivers supply selected drive currents to charge individually the storage capacitors of a row of pixel elements to desired initial voltage levels corresponding to desired gray scale levels for the pixel elements during a row select time to maintain the liquid crystal pixel images for lengths of time proportional to the initial charge levels of the capacitors, which discharge until their individual voltages reach a threshold voltage within predetermined discharge times during one frame time.

19 Claims, 3 Drawing Sheets

FERROELECTRIC LIQUID CRYSTAL DISPLAY APPARATUS AND METHOD OF MAKING IT

TECHNICAL FIELD

The present invention relates in general to an improved liquid crystal display and a method of driving it. The invention more particularly relates to a ferroelectric liquid crystal display and a method of modulating it to produce a number of different shading levels.

BACKGROUND ART

Ferroelectric liquid crystals switched from an activated state by associated very large scale integrated circuitry form versatile and powerful electro-optic modulators for display purposes. Such ferroelectric liquid crystal displays (FLCD) have superior switching speed over the electro-optic effects produced by nematic liquid crystals. However, their non-RMS response to impressed voltages presents not only addressing problems, but also makes achieving a large number of gray scale levels or full color very difficult. Reference may be made to the following published article, which describe many of the problems associated with ferroelectric liquid crystal displays: "ACTIVE BACKPLANE SPATIAL LIGHT MODULATORS USING CHIRAL SEMATIC LIQUID CRYSTALS" by W. A. Crossland, M. J. Birch, A. B. Downey, D. G. Vass, SPIE Volume 1665, Liquid Crystal Materials, Devices, and Applications (1992) pages 114–127. Reference may also be made to U.S. Pat. Nos. 5,325,107; 5,323,172; 5,311,206; 5,280,280; 5,228,013; 4,924,215 and 4,711,591. Each one of the foregoing referenced article and patents are incorporated herein by reference as though fully set forth herein.

Therefore, it would be highly desirable to have a new and improved ferroelectric liquid crystal display apparatus which can be energized to produce a large number of different shading levels. Such a display should be convenient to use and relatively inexpensive to manufacture.

DISCLOSURE OF INVENTION

Therefore the principal object of the present invention is to provide a new and improved ferroelectric liquid crystal display and a method of using and making it to produce a large number of different shading levels, wherein the display is relatively inexpensive to manufacture and convenient to use.

Briefly, the above and further objects of the present invention are realized by providing a new and improved ferroelectric liquid crystal display system having a matrix structure of pixel elements each including a transistor active switching device and a ferroelectric cell. Each switching device is coupled to an individual storage capacitor which is charged during each row select time when the switching device is activated, and which is discharged during each frame time when the switching device is deactivated. A plurality of column drivers charge individually the storage capacitors of a row of pixel elements to desired initial voltage levels corresponding to desired gray scale levels for the pixel elements during a row select time, to maintain the liquid crystal pixel images for predetermined periods of time proportional to the initial charge levels of the capacitors, as they discharge until their individual voltages reach a threshold voltage within predetermined discharge times during one frame time.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
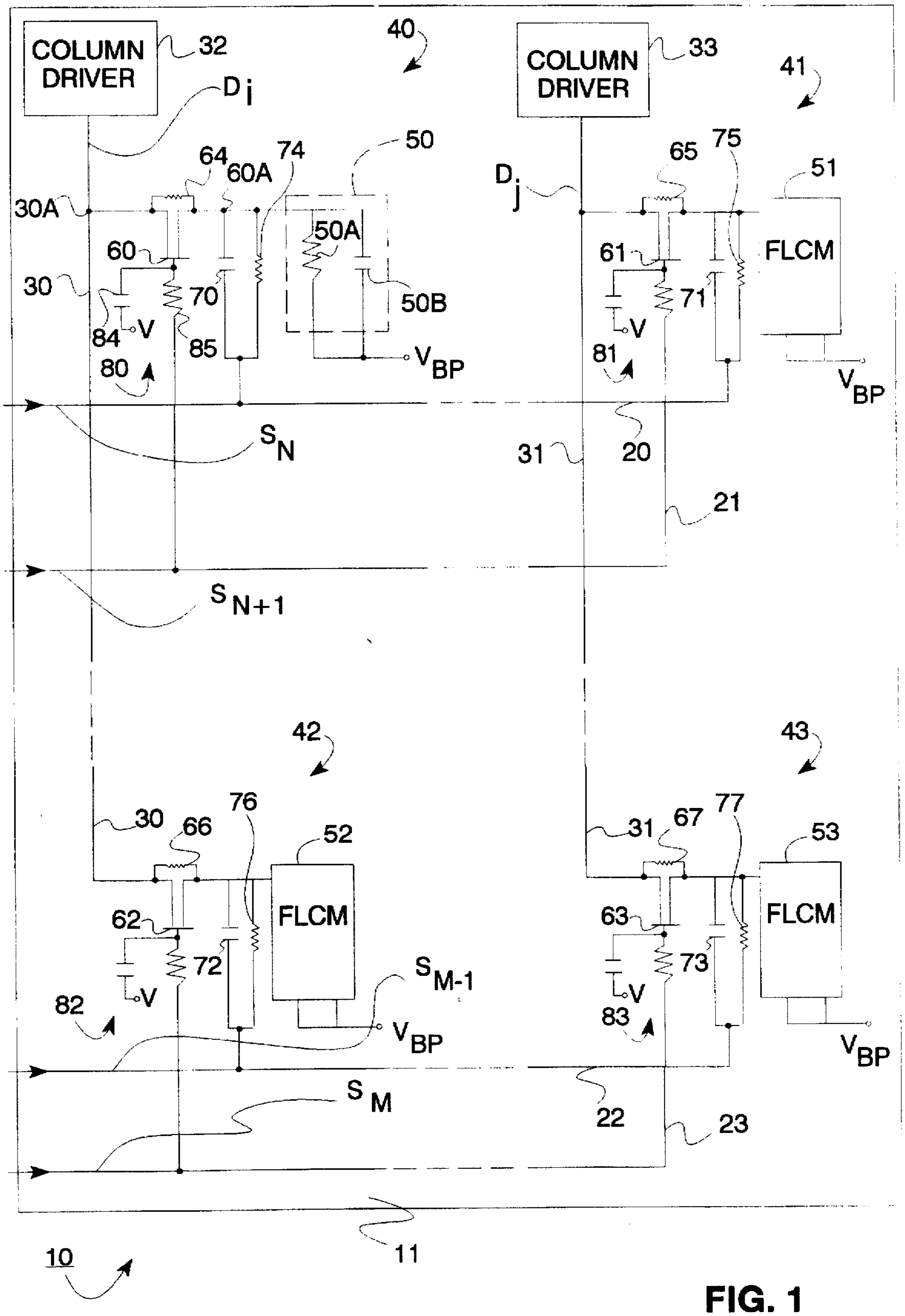
FIG. 1 is a diagrammatic view of a ferroelectric liquid crystal display apparatus, which is constructed in accordance with the present invention.

Referring now to FIG. 1, there is shown a ferroelectric liquid crystal display panel or apparatus 10 which is constructed in accordance with the present invention.

The ferroelectric liquid crystal display panel 10 generally comprises a substrate or backplane 11 having a matrix structure or array of pixel elements, such as the element 40–43, arranged in rows and columns, the remaining elements being omitted for illustration purposes. A plurality of scanning electrodes or row select lines, such as the lines 20–23 and a plurality of signal electrodes or column data lines, such as the lines 30, 31 arranged in a two dimensional matrix array on the substrate 11. The remaining such lines are omitted for illustration purposes. The rows 20–23 are arranged in a parallel spaced-apart manner, while the columns 30,31 are also arranged in a parallel spaced-apart manner.

At the intersection of each row and column electrode, there is disposed one of the pixel elements 40–43. Each element includes a liquid crystal cell, such as the cells 50–53 having a bistable ferroelectric liquid crystal material disposed therein and a switching device, such as the devices 60–63. Such semiconductor devices may be in the form of metal-oxide semiconductor devices, complementary-metal-oxide semiconductor devices, or thin-film transistor devices. The devices 60–63 control the supply of current to each of the cells 50–53 for switching them between an activated or ON state, and a deactivated or OFF state. In this regard, in their ON states, the pixel elements from a desired image during each frame time interval.

For the purpose of clarity, only four pixel elements have been shown on the substrate 11.

In order to energize the pixel elements of the matrix rows, a row select voltage is applied sequentially during each frame time interval to each row on the matrix, while simultaneously a data line or column line voltage is sequentially applied to each column in the matrix. In this regard, at individual relatively short time periods such as about 1 microsecond, each of the pixel elements in any given row are energized to an initial ON state voltage.

Once the row select voltage in any given row is terminated, all of the pixel elements in that row remain in their initialized stage for some period of time. This energized time period, as will be explained hereinafter, depends upon the column line voltages that were initially applied simultaneously to the pixel elements during the time the row select time.

In order to modulate the light produced by the pixel elements, a plurality of column drivers, such as the drivers 32 and 33, supply various data line voltage levels selectively to each of the switching devices, such as the device 60. The remaining column devices have been omitted from the drawings for illustration purposes. A plurality of storage or supply capacitors, such as the capacitors 70–73 each having a slight leakage represented by a set of leakage resistors 74–77, are coupled across the switching devices 60–63 respectively. During corresponding row select times, the capacitors 70–73 are charged by the applied data line voltages to a sufficient voltage level in about 1 microsecond per row every frame time to maintain the pixel elements 40–43 in their ON state during all or some portion of an entire frame time, which can be a relatively long period of time, such as about 16 milliseconds in duration. In this regard, each one of the column drivers, such as the driver 32, supply one of eight available data line voltage levels to energize the pixel elements 40–43 in increments of ⅛ of a full frame time interval to provide eight different gray scale levels. While eight levels are described, it should be understood that even a lower number such as four or smaller, or a larger number such as 32, 64, 256 or higher, of levels may be employed to provide a smaller or larger number of gray scale levels.

From the foregoing, it should be further understood by those skilled in the art that when changing the full frame of information on the panel 10, the row address time at each switching device is substantially shorter than the optical response time of the liquid crystal. The final voltage across each pixel, such as the pixel 40 is then determined by the current flowing to it during the gate pulse time, the leakage of the switching device, the charge leakage of the cell and the discharge of its associated storage capacitor when the gate pulse is OFF. The final liquid crystal optical state then depends on the behavior of the liquid crystal molecules tilt with the charge voltage.

Those skilled in the art will understand that predetermined frame times sufficient to prevent perceptible flicker, such as a 16 millisecond frame time, may be employed.

In operation, different shades of gray are effected by switching the row select lines in synchronization with applying a selected column line or data line voltage to each pixel element to charge the storage capacitors coupled to each ferroelectric liquid crystal cell. In this regard, the ferroelectric material in each selected pixel element remains in the ON state during each frame time interval for a predetermined period of time directly proportional to the column line voltage applied to the pixel element. In this regard, the column line voltage corresponds to the desired gray scale shading level to be produced by the pixel element.

Considering now the panel 10 in greater detail, as each of the pixel elements 40–43 are substantially identical to one another, only the pixel element 40 will now be described in greater detail.

Figure 2:
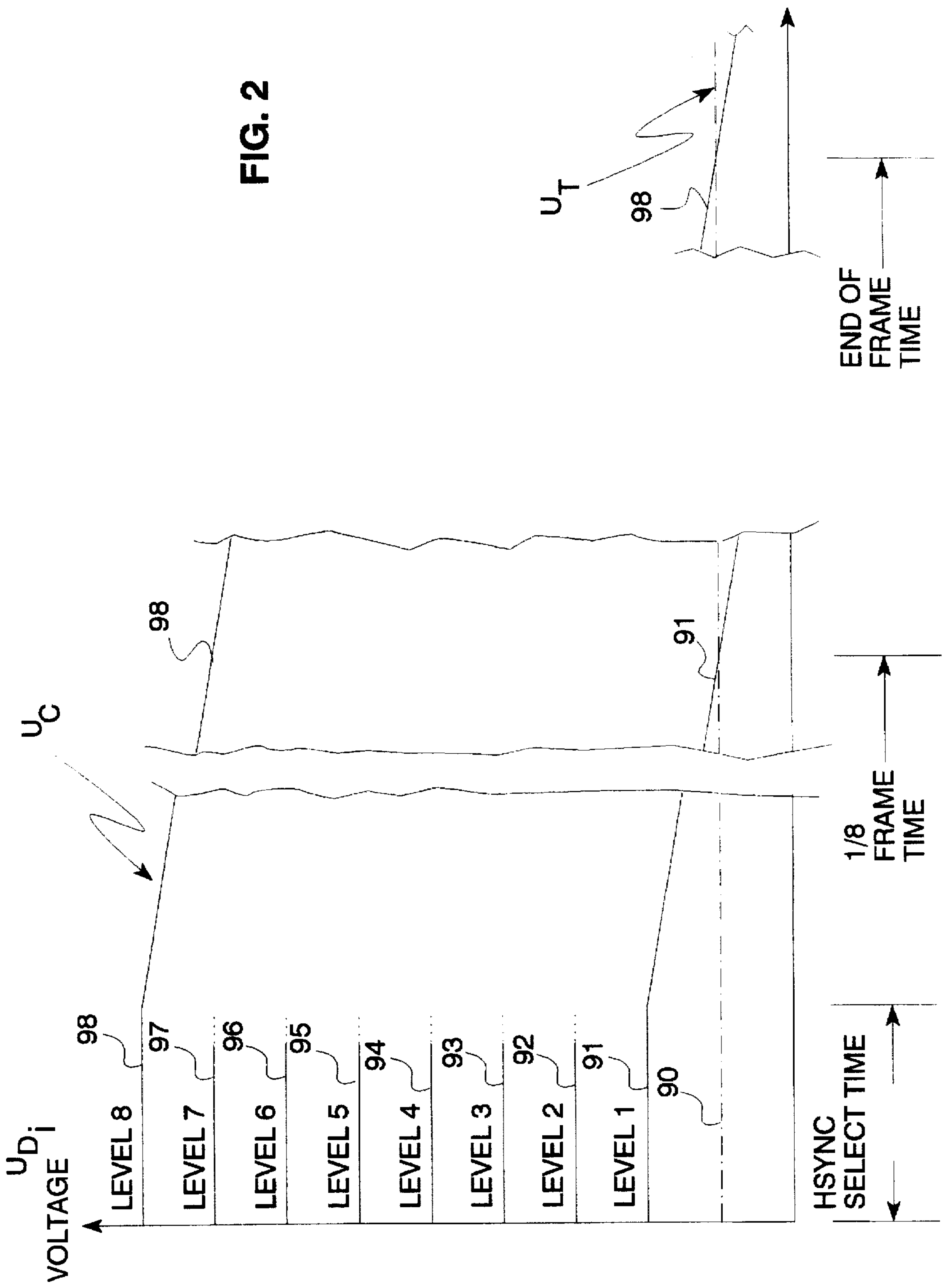
FIG. 2 is a graph illustrating the drive modulation technique for the apparatus of FIG. 1.

Considering now the pixel element 40 in greater detail with reference to FIGS. 1 and 2, during the row select time (H SYNC TIME) for each of the panel rows, a row select voltage for a given row, such as a voltage $U_{S_{n+1}}$ (FIG. 1), is applied to the row select line 21 to enable the switching device 60 to be energized with a desired data line voltage $U_{Di}$. In this regard, as best seen in FIG. 2, the data line voltage applied to each of the switching devices, such as the device 60 is an individual one of eight gray scale level voltages indicated generally at 91–98 respectively. The applied gray scale voltage is sufficient to turn ON the device 60 allowing its associated storage capacitor to charge to the voltage applied at node 60A (FIG. 1). Thus, when the row select voltage $U_{S_{n+1}}$ is terminated, the storage capacitor 70 is charged to a voltage which is substantially the same level as the applied data line voltage $U_{Di}$ (FIG. 1), e.g. the capacitor 70 is charged to one of its gray scale level voltages 91–98.

At the end of the row select time of about one microsecond, all of the storage capacitors in the row previously selected begin immediately to discharge. For example, the storage capacitor 70 begins to discharge through the cell 50 to maintain the ON state for a predetermined period of time, depending upon which one of the eight levels of voltage was selected for the charging of the capacitor during its HSYNC time.

Those skilled in the art will understand that each of the switching devices 60–63 have an associated leakage resistance illustrated schematically as a set of respective leakage resistors 64–67. In this regard, each leakage resistor has a high impedance in the OFF state of the switching device and a low impedance in the ON state, to enable its associated storage capacitor to charge in a very rapid manner. At the end of each frame time interval for a given row, the capacitors for that row are again charged to repeat the above described process.

As best seen in FIG. 1, each leakage resistor is connected between a column line electrode and an associated capacitor node. For example, resistor 64 is connected between a column line electrode 30A and the capacitor node 60A.

The decay voltage of any given pixel element is indicated generally schematically as $U_c$ in FIG. 2, and has a substantially linear decay rate. In this regard, the decay rate of the charge voltage on any storage capacitor, such as the storage capacitor 70, when charged to the maximum data line voltage 98, is sufficient to prevent the discharge voltage from decaying to below a threshold voltage 90 for the ferroelectric cells during any given frame time for a given row of cells.

From the foregoing, those skilled in the art will understand each ferroelectric cell remains in its ON state so long as the discharge voltage of its associated storage capacitor is greater than the threshold voltage 90.

Considering now the ferroelectric cells in greater detail, as each cell is substantially identical to one another, only the cell 50 will be described. In this regard, the cells, such as the cell 50, as best seen in FIG. 1, can be viewed as a leakage capacitor identified by a corresponding equivalent parallel-connected resistance-capacitance pair including a resistor 50A and a capacitor 50B. This pair is connected in parallel between the capacitor node 60A and a common voltage bus $V_{BP}$.

The function of the common voltage bus relative to ferroelectric liquid crystal cells is well known to those skilled in the art.

The discharge time of the storage capacitor 70 is therefore determined by the RC time constant established by the parallel combination of resistor 50A and capacitors 70 and 50B respectively. As best seen in FIG. 2, this time constant is substantially proportional to the data line voltage $U_{Di}$ applied to the pixel element 40.

In order to limit the current applied to the switching devices 60–63, each one of the devices 60–63 includes an RC circuit 80–83 respectively. As each RC circuit is substantially identical, only the RC circuit 80 will now be described in greater detail.

Considering now the RC circuit 80 in greater detail with reference to FIG. 1, the RC circuit 80 is an equivalent circuit and is connected to the gate of the device 60 and includes a resistor 85 connected between the gate of the device 60 and the row select line 21, and a capacitor 84 connected between the gate of the device 60 and a voltage level V.

Referring now to FIG. 2, when any one of the storage capacitors begins to discharge, it continues to maintain its associated ferroelectric liquid crystal cell in its ON state until the voltage drops to the threshold voltage 90 ($U_T$) for the cell. In this regard, the cell remains in the ON state for a predetermined period of time during each frame time. Table I, illustrates the applied data lines voltages and the associated time periods any given cell remains in the ON state.

TABLE I

| Data Line Voltage | ON State | Gray Scale Level |
|---|---|---|
| $U_{D_1}$ (91) | 1/8 Frame Time | 1 |
| $U_{D_2}$ (92) | 2/8 Frame Time | 2 |
| $U_{D_3}$ (93) | 3/8 Frame Time | 3 |
| $U_{D_4}$ (94) | 4/8 Frame Time | 4 |
| $U_{D_5}$ (95) | 5/8 Frame Time | 5 |
| $U_{D_6}$ (96) | 6/8 Frame Time | 6 |
| $U_{D_7}$ (97) | 7/8 Frame Time | 7 |
| $U_{D_8}$ (98) | 8/8 Frame Time | 8 |

Figure 3:
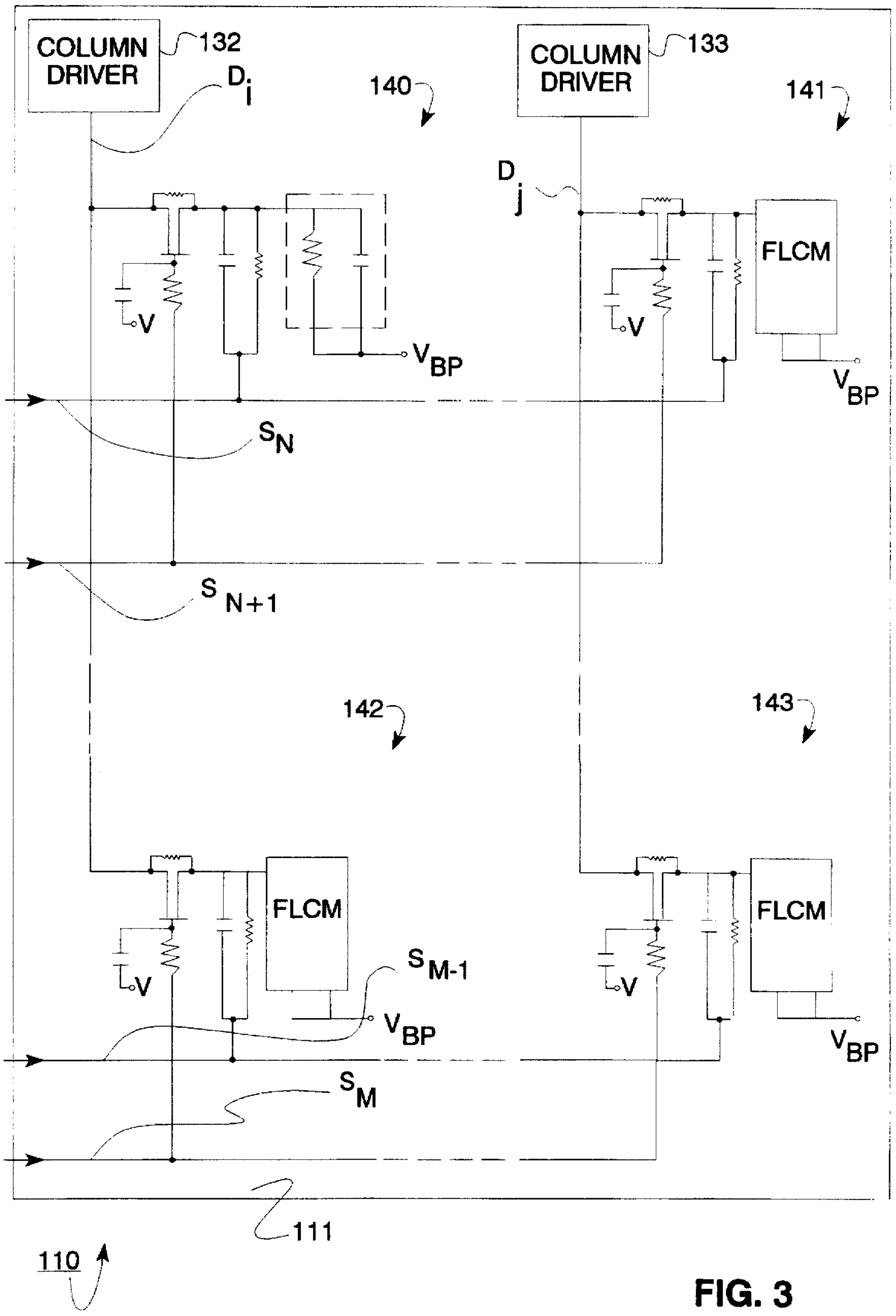
FIG. 3 is a diagrammatic view of a ferroelectric liquid crystal display apparatus, which is constructed in accordance with the present invention.

Referring now to FIG. 3, there is shown another ferroelectric display apparatus 110 which is constructed in accordance with the present invention. Apparatus 110 is substantially similar to apparatus 10 except that instead of eight level column drivers 32 and 33, there is substituted analog drivers 132 and 133 respectively. The analog drivers supply a set of pixel elements 140–143, which are similar to the corresponding elements 40-30 of FIG. 1, on the substrate 111 with an infinite number of continuous voltage levels between 1 and N levels. In this regard, the drivers cause the charging capacitors associated with each pixel element to be charged with a given voltage level in a similar manner as the capacitors are charged in the apparatus 10.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of modulating a bistable ferroelectric liquid crystal display device to produce a plurality of different illumination shading levels for a group of ferroelectric crystal pixel elements arranged in rows and columns, comprising:

charging individually a plurality of storage capacitor means associated individually with a row of pixel elements to selected ones of a plurality of data line voltages indicative of a plurality of the desired gray scale illumination levels during a horizontal row select time; and discharging individually the initially charged storage capacitor means after said row select time to facilitate the activation of a corresponding respective number of ferroelectric liquid crystal pixel cells coupled to said storage capacitor means for predetermined individual periods of time proportional to the initial charge level of said capacitor means during each frame time for said row of pixel elements so that light passing through said pixel cells is modulated to produce the plurality of different shading levels.

2. A bistable ferroelectric liquid crystal display device comprising:

a substrate having a plurality of liquid crystal pixel elements arranged in a matrix array;

each individual one of said elements including a ferroelectric liquid crystal cell for modulating light;

storage capacitor means coupled to said cell for causing a discharge voltage to be applied to the cell to facilitate the activation thereof for a predetermined period of time so that light passed by the cell is modulated to produce one of N different shading levels;

switching means for coupling a selected one of a plurality of data line voltages to said capacitor means to charge it to a desired gray scale level voltage during another predetermined period of time substantially less than the first mentioned predetermined period of time; and drive means coupled to said switching means for supplying it with said selected one of the plurality of data line voltages, whereby when said storage capacitor means discharges said ferroelectric liquid crystal cell remains sufficiently activated to pass light for said first mentioned predetermined period of time during each frame time.

3. A ferroelectric display device according to claim 2, wherein said switching means is a semiconductor device.

4. A ferroelectric display device according to claim 3, wherein said semiconductor device is a complementary-metal-oxide semiconductor.

5. A ferroelectric display device according to claim 3, wherein said semiconductor device is a metal-oxide semiconductor device.

6. A ferroelectric display device according to claim 3, wherein said semiconductor device is a thin-film transistor device.

7. A ferroelectric display device according to claim 2, wherein said drive means is an N level driver for supplying a selected one of N different data line voltage levels.

8. A ferroelectric display device according to claim 2, wherein said drive means is an analog driver for supplying a selected one of an infinite number of different data line voltage levels between 1 and N.

9. A ferroelectric display device according to claim 2, wherein said another predetermined period of time is about one microsecond.

10. A ferroelectric display device according to claim 2, wherein said first mentioned predetermined period of time is about 16 milliseconds.

11. A ferroelectric display device according to claim 2, wherein said first mentioned predetermined period of time is proportional to the initial charge level of said capacitor means.

12. A ferroelectric display device according to claim 2, wherein said first mentioned predetermined period of time is directly proportional to said selected one of N different data line voltages.

13. A ferroelectric display device according to claim 2, wherein said ferroelectric cell includes a ferroelectric liquid crystal material that is activated to pass light in an ON state and is deactivated to limit the passage of light therethrough in an OFF state.

14. A ferroelectric display device according to claim 13, wherein said ON state will be maintained so long as said discharge voltage is greater than a threshold voltage.

15. A ferroelectric display device according to claim 14, wherein said data line voltage includes a maximum data line voltage.

16. A ferroelectric display device according to claim 15, wherein said maximum data line voltage is sufficient to prevent said discharge voltage from decaying to below said threshold voltage during any given frame time.

17. A ferroelectric display device according to claim 14, wherein said discharge voltage has a decay rate that is substantially linear.

18. A ferroelectric display device according to claim 2, wherein said N is 8.

19. A ferroelectric display device according to claim 2, wherein said N is 256.

* * * * *